H. & J. WAGONER & F. HORN.
COMBINED LAND ROLLER AND HARROW.
No. 195,189. Patented Sept. 11, 1877.
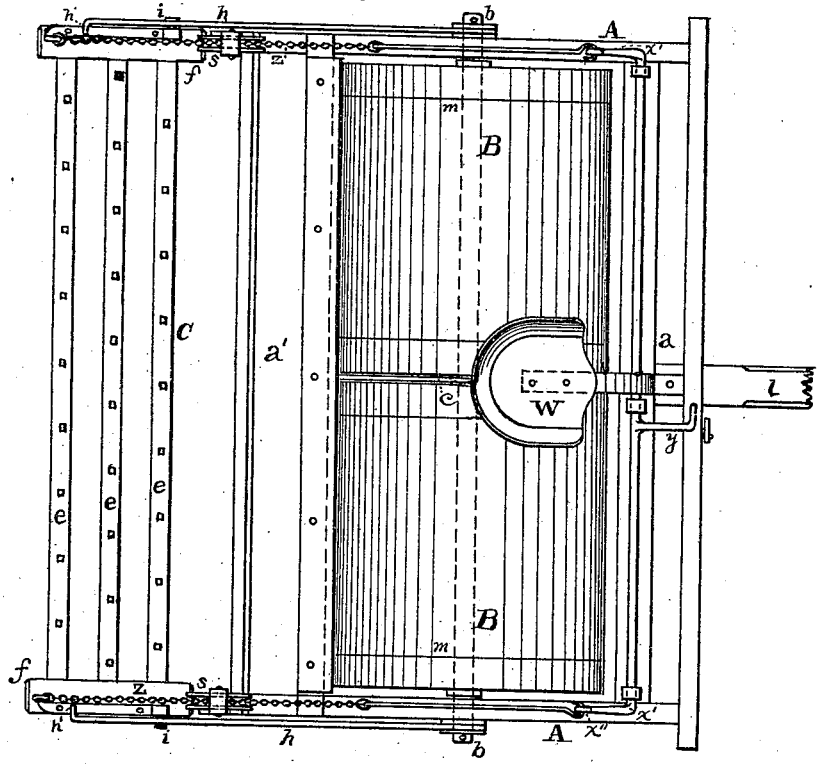
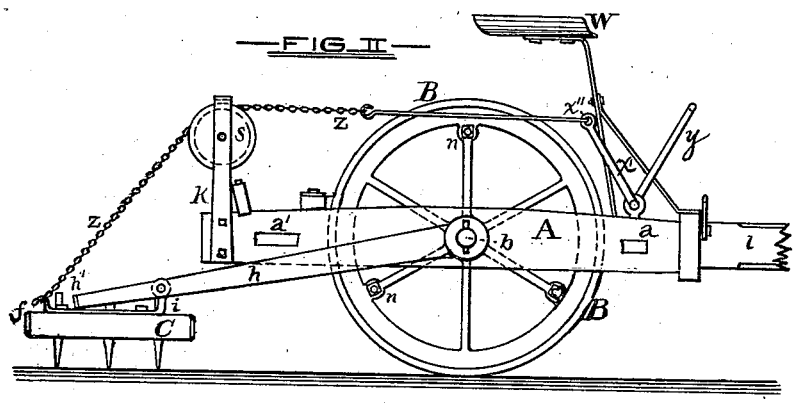
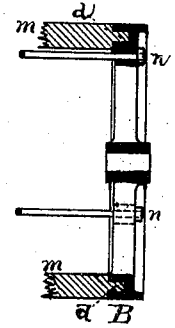
WITNESSES
Chas. E. Lewis.
Geo. W. Hook.
INVENTORS
Harrison Wagoner
John Wagoner
Ferdinand Horn
By Chas. B. Mann, Atty

UNITED STATES PATENT OFFICE.

HARRISON WAGONER, JOHN WAGONER, AND FERDINAND HORN, OF COSHOCTON, OHIO.

IMPROVEMENT IN COMBINED LAND-ROLLER AND HARROW.

Specification forming part of Letters Patent No. 195,189, dated September 11, 1877; application filed July 12, 1877.

*To all whom it may concern:*

Be it known that we, HARRISON WAGONER, JOHN WAGONER, and FERDINAND HORN, of Coshocton, in the county of Coshocton and State of Ohio, have invented a new and useful Improvement in Combined Land-Roller and Harrow, which is fully set forth in the following specification and accompanying drawing, in which—

Figure 1 is a plan view of a land-roller and harrow embodying our improvement. Fig. 2 is a side elevation of same. Fig. 3 is a sectional view of roller-wheel.

Our invention will first be described in connection with the drawing, and then pointed out in the claims.

The roller-frame A is of the usual construction. Attached to the rear of each end of the frame is an upright, $k$, having at its top a pulley, $s$. To the front part of the frame is affixed a rock-shaft, which extends across from side to side, and bent up at each end, forming an arm, $x'$, with an eye, $x''$, on the end, and with a treadle, $y$, attached in position to be reached by the driver, who occupies the seat W.

The rollers B, which, in the present example, are in two sections, but may consist in more if preferred, revolve on the shaft $b$, the ends of which extend from the outside of side beams. Between the rollers is a flat bar, $c$, extending lengthwise from the front beam $a$ to the rear beam $a'$, to which its ends are bolted. The shaft turns through this central bar, and by it is supported. The rollers are formed of two cast-iron wheels, which have double rims, forming an annular groove on the inner side of the rim, as shown at $d$ in Fig. 3. The two wheels are placed with the grooves facing, and wooden staves, with their ends tenoned, are inserted in the grooves; and the roller, thus formed, is held together by bolts extending from wheel to wheel. By this construction the face of the stave and the periphery of the wheel-rim are flush, and the roller, both interiorly and exteriorly, is smooth, which gives the advantage of the dirt not adhering to the inner side.

The harrow C consists of three parallel beams, $e$, framed six or eight inches apart into end pieces $f$, with teeth of half-inch square steel set seven inches apart. Iron draft bars $h$ are pivoted to the front of each end of the harrow by an upright standard, $i$, and said draft-bars extend to the rear of each end of the harrow; and the end of the bar is bent inward, as shown at $h'$, and rests on the top of the harrow, whereby the harrow is held level to the ground, and that objectionable feature of tilting up in the rear is prevented.

Chains or ropes $z$, attached at the rear of each end of harrow, pass over the pulleys, and are secured to the eyes $x''$ of the arms of the rock-shaft. By depressing the treadle $y$ the harrow is elevated bodily. It may be raised slightly or entirely from the ground.

The harrow is quickly detached from the roller by drawing the pins in the ends of the shaft and loosening the chains or ropes, so that the roller may be used with or without the harrow attachment.

Having described our invention, we claim and desire to secure by Letters Patent—

1. In a combined land-roller and harrow, the draft-bars $h$, pivoted to the front of the harrow, and extending to the rear and resting on top of same, as shown and described, and for the purpose specified.

2. The land-roller and harrow, consisting of roller-frame A, pulleys $s$, mounted on the uprights $k$, rock-shaft with arms $x'$ and treadle $y$, draft-bars $h$, pivoted to the front of the harrow, and extending to the rear and resting on top of same, and chains or ropes $z$, arranged and operating substantially as shown and described.

HARRISON WAGONER.
JOHN WAGONER.
FERDINAND HORN.

In presence of—
J. S. ELLIOTT,
JAMES W. BEEBE.